United States Patent [19]

Lecocq

[11] Patent Number: 5,073,902
[45] Date of Patent: Dec. 17, 1991

[54] DEVICE FOR RECEIVING INFORMATION TRAVELLING ON TWO CAPACITIVELY COUPLED INFORMATION TRANSMISSION LINES, IN PARTICULAR FOR A MOTOR VEHICLE

[75] Inventor: Jean-Luc Lecocq, Sevres, France

[73] Assignees: Automobiles Peugeot, Paris; Automobiles Citroen, Neuilly/Seine; Regie Nationale des Usines Renault, Boulogne Billancourt, all of France

[21] Appl. No.: 538,429

[22] Filed: Jun. 15, 1990

[30] Foreign Application Priority Data

Jun. 19, 1989 [FR] France ............... 89 08123

[51] Int. Cl.⁵ ........................... H04B 3/00
[52] U.S. Cl. ..................... 375/36; 375/104; 307/8; 307/84
[58] Field of Search ............. 375/36, 99, 104; 178/63 C; 307/8, 84, 355

[56] References Cited

U.S. PATENT DOCUMENTS

| | | | |
|---|---|---|---|
| 4,380,080 | 4/1983 | Rattlingourd | 375/36 |
| 4,473,759 | 9/1984 | Mahabadi | 307/355 |
| 4,504,975 | 3/1985 | Jarret et al. | 375/36 |
| 4,642,807 | 2/1987 | Comroe | 371/31 |
| 4,883,987 | 11/1989 | Fattaruso | 307/355 |

FOREIGN PATENT DOCUMENTS 0318354 5/1989 European Pat. Off. .
2422288 11/1979 France .

Primary Examiner—Benedict V. Safourek
Assistant Examiner—Young Tse
Attorney, Agent, or Firm—Burns, Doane, Swecker & Mathis

[57] ABSTRACT

A device including a comparator (3) each input of which receives signals from an information transmission line (1, 2) through a capacitor (4, 5), is characterized in that devices for forced switching (6) are interposed between the information transmission lines (1, 2) and the inputs of the comparator (3), the output of the latter being connected to one input of an OR gate (7) whose other input receives a reinitialization signal from a protocol decoder and whose output is connected directly and through an inverter to the device for forced switching (6) in order to reinitialize the comparator when the latter is blocked in a dominant state following interference.

2 Claims, 2 Drawing Sheets

DEVICE FOR RECEIVING INFORMATION TRAVELLING ON TWO CAPACITIVELY COUPLED INFORMATION TRANSMISSION LINES, IN PARTICULAR FOR A MOTOR VEHICLE

BACKGROUND OF THE INVENTION

1. Field of the Invention

The present invention relates to a device for receiving information travelling on two capacitively coupled information transmission lines, in particular for a motor vehicle.

2. Description of Related Art

Information receiving devices of this type are already known in the state of the art, and which are integrated into electronic modules used for example in information transmission networks of motor vehicles and comprising a comparator each input of which receives signals from an information transmission line and which is biased in such a way that in the absence of information on the line the device outputs a privileged item of information, referred to as recessive state.

In the state of the art each input of the comparator is connected to an information transmission line through a capacitor, as well as to a supply through a resistor and to earth through another resistor.

The resistors for biasing the inputs of this comparator are rated in such a way as to obtain different biasing voltages at the input terminals of this comparator whilst keeping a pairing-up of the resistors and of the capacitors such that a similar time constant is maintained on the two information transmission lines.

The advantage of this structure is the automatic return to the recessive state after a discharge of the capacitive networks, allowing the continuation of the transmissions by other modules connected to the network.

However, these devices possess a certain number of disadvantages insofar as the input voltage possesses a high threshold, whence arises a temporal distortion in the signals at the output of the comparator. This manifests, for example, by a modification of the cyclic ratio of the signals in the case of pulse-width modulation (PWM) encoding, which is prejudicial to good signal recognition and to good message synchronization.

Moreover, the time constants of the RC circuits formed at the terminals of this comparator are dependent on the transmission frequency and on the encoding of the bits.

Hence the aim of the invention is to resolve these problems by proposing an information receiving device which is simple and reliable and whose output signals are free of faults.

SUMMARY OF THE INVENTION

To this end, the subject of the invention is a device for receiving information travelling on two capacitively coupled information transmission lines, in particular for a motor vehicle, of the type comprising a comparator each input of which receives signals from an information transmission line through a capacitor, characterized in that means for forced switching are interposed between the information transmission lines and the inputs of the comparator, the output of the latter being connected to one input of an OR gate whose other input receives a reinitialization signal from a protocol decoder and whose output is connected directly and through an inverter to the means for forced switching in order to reinitialize the comparator when the latter is blocked in a dominant state following interference.

BRIEF DESCRIPTION OF THE DRAWINGS

The invention will be better understood with the aid of the description which follows, given only by way of example and with reference to the attached drawings in which.

DESCRIPTION OF THE PREFERRED EMBODIMENTS

Figure 1:
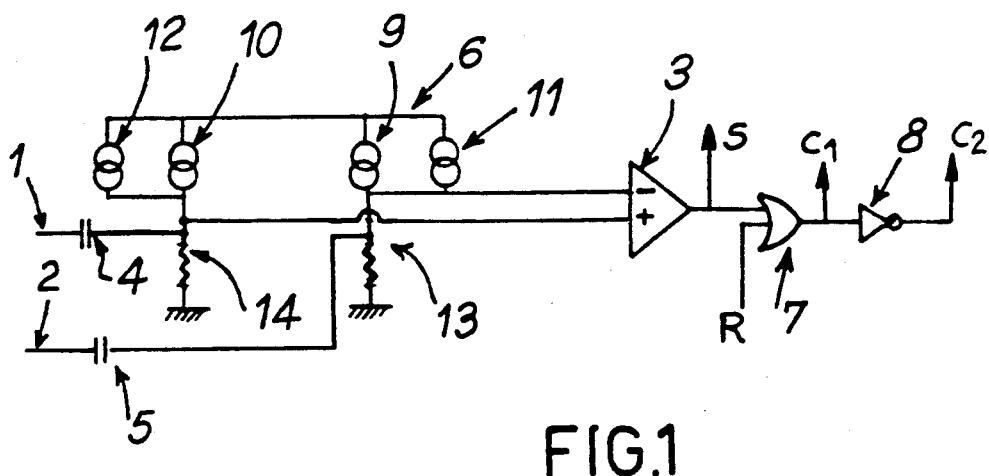
FIG. 1 shows a synoptic diagram of a receiving device according to the invention.

As can be seen in FIG. 1, a device for receiving information travelling on two information transmission lines 1 and 2, on which respectively travel information and its supplementary information, comprises a comparator 3 consisting, for example, of a comparator of conventional type, whose non-inverting and inverting inputs are connected to the information transmission lines 1 and 2 through capacitors 4 and 5 respectively.

Means for forced switching 6 are also interposed between the information transmission lines 1 and 2 and the inputs of the comparator 3 and, more particularly, between the capacitors 4 and 5 and the corresponding inputs of the comparator.

The output S of the comparator is connected to one input terminal of an OR gate 7 receiving on its other input terminal a reinitialization signal R coming from a protocol decoder whose function will be described in more detail further on. The output of this OR gate 7 is connected directly and through an inverter 8 that is to say at C1 and C2 respectively, to the means for forced switching in order to reinitialize the comparator 3 when the latter is blocked, for example following interference, as will be described in more detail further on.

For each input of the comparator the means for forced switching comprise a first current generator 9 and 10 and a second controllable current generator 11 and 12 respectively for the inverting and non-inverting inputs of this comparator. These inputs are also earthed through resistors 13 and 14 respectively.

The first current generators 9 and 10 serve to create a bias at each input of the comparator whilst the second current generators 11 and 12 are current generators controllable by the direct and inverted outputs of the OR gate 7, that is to say the terminals C1 and C2 previously described, and which serve to create a hysteresis at the terminals of this comparator.

This allows the creation of a small offset and large centered hysteresis comparator, the flipping of the output of this comparator being precisely determined as a function of the various parameters of the means for forced switching.

As the offset is small, the triggering thresholds are symmetric about the biasing voltage and whatever be the direction of flipping the output signals from the comparator possess similar propagation times and hence analogous shapes to those of the signals travelling on the information transmission lines.

In the event of interference the comparator can flip into a dominant state and in the absence of an offsetting voltage, remain in this position.

This phenomenon can occur on all the other modules of the transmission network, for example of the vehicle. These modules will then detect that the information transmission line is busy (global error) and hence they will not be able to send any messages so that the information transmission may be blocked.

In order to avoid this situation a protocol decoder integral with the information transmission network of the vehicle sends, at the end of a specific period greater than the longest period of the dominant level permitted by the transmission protocol, a reinitialization signal to the control terminal of the device, consisting of one of the input terminals of the OR gate 7, in order to make the comparator flip into the recessive state with the aid of the second current generators of the means for forced switching and thus allow reinitialization of a transmission.

In fact, these second generators of the means for forced switching are connected, on the one hand, to the outputs C1 and C2 respectively direct and inverted of this comparator, and on the other hand, to the noninverting and inverting inputs of this comparator, in order to make the latter flip under control of the signals at C1 and C2 as is the case for example when the protocol decoder sends a reinitialization signal R to the corresponding input terminal of the OR gate 7.

Figure 2:
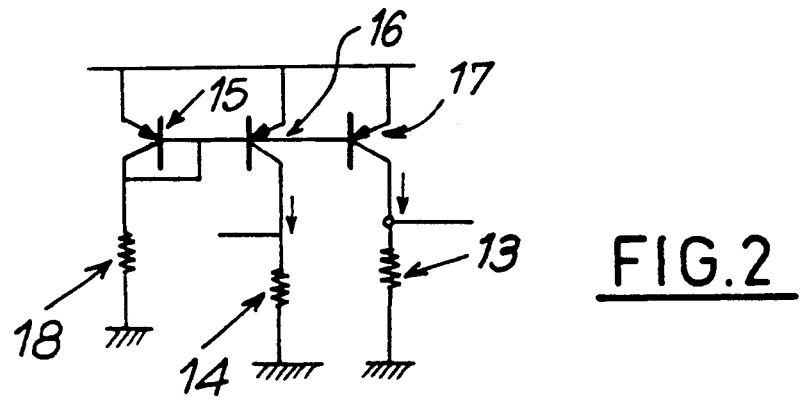
FIG. 2 shows an embodiment of first current generators forming part of a device according to the invention.

In FIG. 2 an embodiment has been shown of the first current generators forming part of the means for forced switching described in relation with FIG. 1.

These first current generators comprise a certain number of transistors 15, 16 and 17 as well as the biasing resistors 13 and 14 already mentioned previously and another biasing resistor 18.

Figure 3:
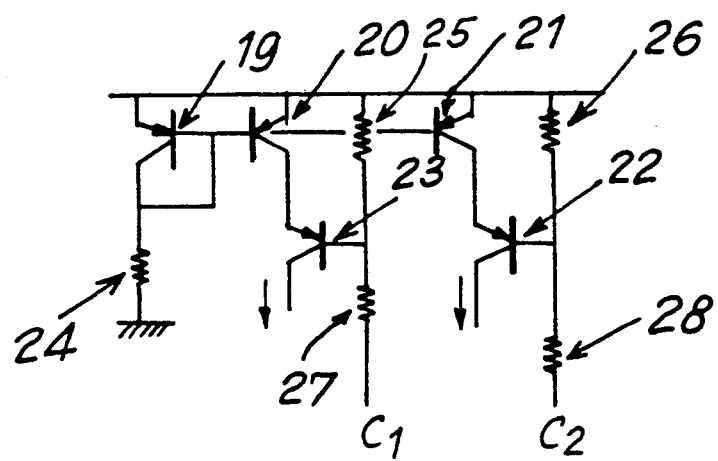
FIG. 3 shows an embodiment of second current generators forming part of a device according to the invention.

For its part, FIG. 3 shows an embodiment of the second current generators forming part of the means for forced switching. These second current generators also comprise a certain number of transistors 19, 20, 21, 22 and 23 and of resistors 24, 25, 26, 27 and 28, the resistors 27 and 28 being connected respectively to the outputs C1 and C2 described in relation with FIG. 1, for the control of these generators and hence of the flipping of the comparator.

As the structure of these current generators is conventional and does not possess any particular difficulties, they will not be described in more detail.

As mentioned previously the means for forced switching allow construction of a small offset and high centered hysteresis comparator making it possible to obtain output signals free of faults.

The offset is given by the pairing-up of the resistors and the imprecision of the current generators.

Furthermore, if the current generators are integrated onto a single substrate the values of these generators may be very close.

In practice, an offset value less than 30 millivolts may be used and the hysteresis value may in practice be equal to 150 millivolts.

As has been previously mentioned the output from the comparator 3 which confronts the OR gate 7 jointly with a reinitialization input coming from the protocol decoder allows, when the comparator is blocked due for example to interference and in the absence of a transmission, reinitialization of this comparator by forcing one or other of the inputs of the comparator by the corresponding second controllable current generator 11 or 12 and restoring of the information transmission.

Figure 4:
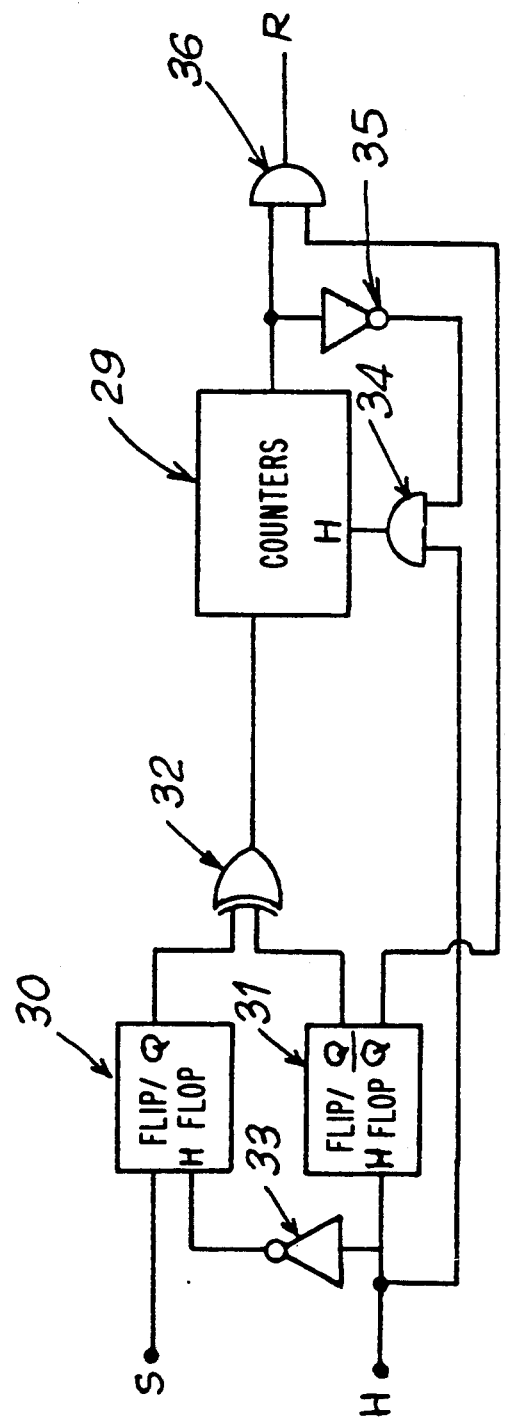
FIG. 4 shows a reinitialization circuit for a receiving device according to the invention.

This reinitialization is carried out for example by virtue of the circuit shown in FIG. 4. This circuit receives an input signal S and a clock signal H and comprises a portion for mounting, a portion for reinitialization and a portion for reshaping the signals.

The portion for counting comprises one or more cascade-mounted counters 29 connected to reinitialization means comprising flip-flops 30 and 31 receiving the signals S and H as input and whose, outputs Q are connected to the inputs of an exclusive OR gate 32. The output of this gate is connected to the counter 29. The flip-flop 30 also receives the clock signal H as input through an inverter 33.

Thus, on each change of state of the signal S a reinitialization signal is transmitted towards the counting means.

On its clock input H the counter 29 receives an output signal from an AND gate 34 receiving as input the signal H and the output signal of the counter 29 through an inverter 35 in order to block this counter when the predetermined counting value is reached.

The output of the counter 29 is also connected to the input of an AND gate 36 whose other input receives the inverted input signal S through the flip-flop 31. This allows the creation of a reinitialization signal at the output R of this gate 36 in the event that the signal S remains at 0 for too long and allows unblocking of the comparator in order to bring it into a recessive state.

Of course, other embodiments of these means may be envisaged.

I claim:

1. A device for receiving information travelling on capacitively coupled information transmission lines comprising:

a comparator, each input of which receives signals from an information transmission line through a capacitor;

means for forced switching of the comparator between a recessive state and a dominant state, the means for forced switching being interposed between the information transmission lines and the inputs of the comparator;

a protocol decoder for generating a reinitialization signal;

an OR gate, one input of the OR gate being one input of the OR gate being connected to an output of the comparator and another input of the OR gate being connected to the protocol decoder to receive a reinitialization signal from the protocol decoder, and an output of the OR gate being connected directly and through an invertor to the means for forced switching so that the means for forced switching reinitializes the comparator when the comparator is blocked in the dominant state.

2. A device according to claim 1, wherein the means for forced switching includes current generator sets, a current generator set being connected to each input of the comparator and comprising, a first current generator for biasing a corresponding input of the comparator; and a second current generator, controllable by the OR gate either by a signal directly output by the OR gate or by a signal inverted by the invertor connected to the output of the OR gate, the second current generator being adapted to create a hysteresis centered at the terminals of the comparator.

* * * * *